United States Patent
Chowdhury et al.

(10) Patent No.: US 7,558,485 B2
(45) Date of Patent: Jul. 7, 2009

(54) PROCESSES AND SYSTEMS INVOLVING OPTICAL PHASE CONJUGATORS

(75) Inventors: Aref Chowdhury, Springfield, NJ (US); Rene' -Jean Essiambre, Red Bank, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 700 days.

(21) Appl. No.: 10/441,532

(22) Filed: May 20, 2003

(65) Prior Publication Data

US 2004/0234274 A1      Nov. 25, 2004

(51) Int. Cl.
*H04B 10/12*    (2006.01)
(52) U.S. Cl. ..................................... 398/150
(58) Field of Classification Search ................. 398/150, 398/157; 359/300, 326
See application file for complete search history.

(56) References Cited

U.S. PATENT DOCUMENTS

| | | | | |
|---|---|---|---|---|
| 5,365,362 A * | 11/1994 | Gnauck et al. | ............... | 398/150 |
| 5,400,164 A * | 3/1995 | Kurtzke et al. | ............... | 398/150 |
| 5,532,868 A * | 7/1996 | Gnauck et al. | ............... | 359/332 |
| 5,777,770 A | 7/1998 | Naito | | |
| 5,798,853 A | 8/1998 | Watanabe | | |
| 6,160,942 A * | 12/2000 | Watanabe | .................... | 385/122 |
| 6,486,989 B2 * | 11/2002 | Shinoda | ........................ | 398/79 |
| 6,504,972 B2 * | 1/2003 | Watanabe | ..................... | 385/24 |
| 6,626,592 B2 * | 9/2003 | Watanabe | ................... | 398/150 |
| 6,665,113 B2 * | 12/2003 | Aso et al. | ..................... | 359/326 |
| 6,704,519 B1 | 3/2004 | Brener et al. | | |
| 6,724,997 B2 * | 4/2004 | Oksanen | ...................... | 398/150 |
| 6,744,553 B1 * | 6/2004 | Islam et al. | .................. | 359/326 |
| 6,751,421 B1 * | 6/2004 | Ranka et al. | ................. | 398/141 |
| 6,771,853 B2 * | 8/2004 | Watanabe | ..................... | 385/24 |
| 6,943,935 B2 | 9/2005 | Bickham et al. | | |
| 6,963,675 B2 * | 11/2005 | Watanabe | ..................... | 385/11 |
| 7,016,583 B2 | 3/2006 | Downie et al. | | |
| 7,061,664 B2 * | 6/2006 | Aso et al. | ..................... | 359/332 |
| 7,068,938 B1 | 6/2006 | Islam et al. | | |
| 2003/0072513 A1 | 4/2003 | Gingener et al. | | |
| 2004/0008403 A1 * | 1/2004 | Kondoh et al. | ............... | 359/326 |

OTHER PUBLICATIONS

Brener, I, Cancellation of all Kerr . . . Optical Fiber Commun Conf 2000. Post Deadline Paper PD 33-1.
Patent App by Brener incorporating information in the above Brener paper U.S. Appl. No. 09/519654 Mar. 6, 2000.
Gagliardi, R.M. & Karp, S. The Optical Communication System, In: Optical Communications, 2nd Ed., John Wiley & Sons, 1995, pp. 1-8.

* cited by examiner

*Primary Examiner*—Shi K Li

(57) ABSTRACT

The desirable effects of an optical phase conjugator are accompanied by a frequency shift with reversal of the frequency order of channels in a multichannel optical communication system. Such effects are rectifiable by employing a sequence involving demultiplexing the multichannel signal, operating on the individual, demultiplexed channel with a corresponding optical phase conjugator or frequency shifter followed by multiplexing the signal. This sequence is combined with a complementary operation—optical phase conjugator to complement a frequency shifting sequence or frequency shifting to complement an optical phase conjugating sequence.

18 Claims, 4 Drawing Sheets

PROCESSES AND SYSTEMS INVOLVING OPTICAL PHASE CONJUGATORS

FIELD OF THE INVENTION

This invention relates to multichannel optical communication and in particular to multichannel optical communication involving optical phase conjugators (OPCs).

BACKGROUND OF THE INVENTION

In multichannel optical communication a multiplicity of channels (often up to 256 channels) carrying information is employed. Each channel carries information imposed on a modulated carrier optical signal within a relatively narrow range of wavelengths—typically a wavelength range between 0.1 Å and 25 Å. Thus as shown in FIG. 1 a series of channels, 7, 8, 9, and 10 (each represented by a spike corresponding to its center wavelength) comprises the signal carrying capacity of an illustrative optical communication system. Depending on the system, the longer wavelengths travel faster than the shorter or the shorter faster than the longer. Assuming the longer wavelengths are faster, a pulse in a particular channel after traversing a portion of the optical communication system would spread to broaden the pulse. Generally, dispersion compensators are employed to remove this pulse broadening within each channel.

Newly proposed systems such as discussed in Brener, I. et.al. (2000) "Cancellation of all Kerr Nonlinearities in Long Fiber Spans Using a $LiNbO_3$ Phase Conjugator and Raman Amplification," Optical Fiber Communications Conference, Post deadline Paper PD 33-1, have contemplated the use of OPCs in addition to other devices such as distributed Raman amplifiers. An OPC has the effect of inducing a conjugation of the phase of a signal and has been contemplated for use to reduce the problems associated with nonlinear effects in optical fibers. As more devices are added to optical communication systems the combined effect on a signal especially in a multichannel environment becomes complex.

SUMMARY OF THE INVENTION

It has been appreciated that after propagation through an OPC the resulting signal in a multichannel system corresponding to channels 31, 32, 33 is conjugated and has been changed in frequency to 31', 32', 33', respectively as shown in FIG. 2 with the frequency order of the channels reversed and with the frequency of the channels shifted symmetrically around the frequency 35. For devices whose operation is based on a four-wave mixing mechanism or cascaded three-wave mixing, the channel frequency is mirrored around the OPC pump frequency. For devices whose operation is based on a three-wave mixing mechanism without cascading the signal frequency is mirrored around half the OPC pump frequency. (See Chou, et.al. IEEE Photonics Technology Letters, 11, 653 (1999) for an example of a cascaded three-wave mechanism.) For simplicity the frequency around which the mirroring occurs will be referred to as the pump frequency for all devices irrespective of mechanism. For many systems this reversal of channel order and shift of frequency is not acceptable because the properties of the line with respect to new wavelengths following the OPC are generally different than that before the OPC. Moreover, reversal of channel order and frequency shifting of channels has the potential to reduce the efficiency of wavelength management in an optical network as well as to reduce the efficient use of the amplifier bandwidth in a given transmission line. Thus an approach to correct the frequency shift and reorder of the channels is desirable. Nevertheless, any such approach should be accomplished without substantially affecting the phase conjugation produced by the OPC and employed for example to reduce nonlinear effects.

By a specific set of optical operations it is possible to correct channel order reversal and frequency shift without compromising the desired modification in phase produced by an OPC. This set of three operations includes the demultiplexing of the multichannel optical signal, the use of an OPC or a frequency shifter for at least one of the demultiplexed channels, and the multiplexing of at least one of the channels treated with the OPC or with the frequency shifter with at least one other channel—whether or not this second channel has undergone an OPC or a frequency shifter. Thus, in the context of this invention, one of two possible demultiplexing/multiplexing (DM) sequences is used, i.e. a demultiplexer then an OPC for each channel to be conjugated then a multiplexer is used in a combination denominated a conjugator DM sequence or similarly a demultiplexer then a frequency shifter for individual channels and then a multiplexer is used in a combination denominated a frequency shifter DM. This set of three generic operations (in the context of this invention denominated a DM sequence to encompass both conjugator DMs and frequency shifter DMs) is used together with a complementary operation i.e. an OPC if a frequency shifter is used in the DM sequence or frequency shifter if an OPC is used in the DM sequence. For example, the use of two OPCs on the multiplexed signal operates as a frequency shifter i.e. does not change the phase or channel order of the multiplexed multichannel signal that propagates through it but shifts the channel frequencies. Such frequency shifter is a complementary device to a conjugator DM sequence. The conjugator DM conjugates the phase of OPC treated channels, leaves the order of the OPC treated channels but shifts the frequency of the treated signals. As a complement a frequency shifter does not conjugate the phase of the channels but shifts the frequency to correct for the frequency shift induced by the conjugator DM sequence. It is possible to employ a frequency shifter sequence (or single operation) before the conjugator DM sequence, after the conjugator DM sequence, or perform part of the frequency shifter sequence before the conjugator DM sequence and the remainder after the conjugator DM sequence.

Analogously, a frequency shifter DM shifts the frequency and order of the channels while the complementary OPC conjugates the phase of the channels and restores the channel order. The same effect is attainable whether the OPC is used before or after the frequency shifter DM. It is also possible to use individual OPCs or frequency shifters in the DM sequence on bands of channels rather than on single channels. In this manner the reversal of bands of channels, not individual channels, is accomplished. Thus in the context of this invention, the term channel includes a band that is less than all the channels of the signal.

DETAILED DESCRIPTION

As discussed the invention involves the use of a DM sequence in conjunction with a complementary operation.

Although the invention is generic to this concept, for pedagogic reasons the invention is described with respect to five advantageous embodiments. However the invention is not limited merely to such embodiments. With respect to each embodiment, useful device combinations to implement each embodiment are shown in FIGS. 2, 5, 8, 11, 12 corresponding to embodiments 1 through 5 with FS indicating a frequency shifter, Demux being a demultiplexer, Mux being a multiplexer and OPC being an optical phase conjugator.

In the first embodiment the frequency shifter includes two OPCs and the multichannel signal is first subjected in sequence to both these OPCs to accomplish the frequency shift. (For purposes of illustration the description will be in terms of three channels having three different center wavelengths. However the invention irrespective of particular embodiment is not limited to any specific number of channels and three is chosen solely to simplify the description. Similarly two OPC operations are used to exemplify a frequency shifter. It is however possible to accomplish such a frequency shift either in one operation or in a sequence of operations. Nevertheless the frequency shifter used whether it is a single device used to perform a single operation or a sequence of operations performed with a multitude of devices is equally applicable to the invention.)

Figure 1:
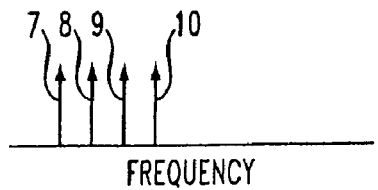
FIG. 1 is illustrative of characteristics of multichannel systems.
Figure 2:
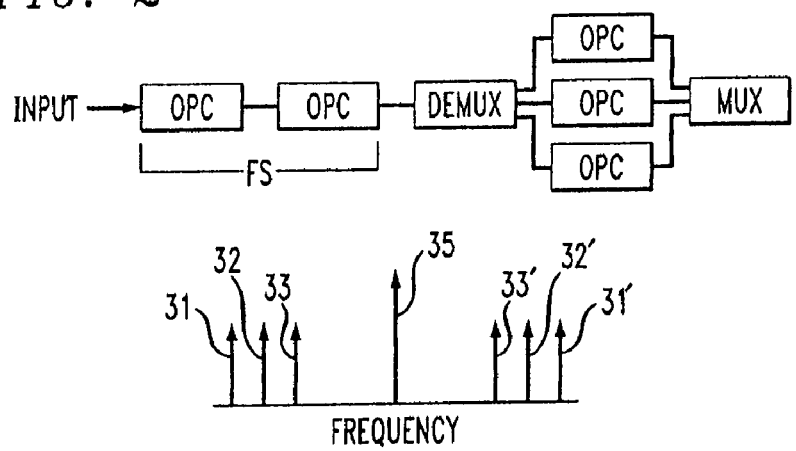
FIG. 2 shows the effect of an OPC.
Figure 3:
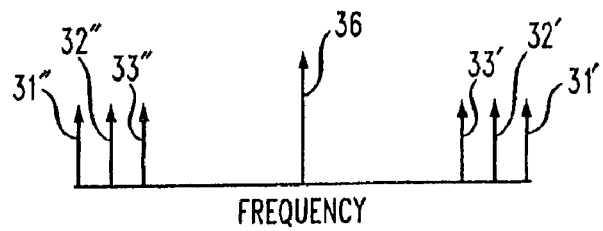
FIGS. 3-13 exemplify the subject invention.

Thus in the context of three channels, 31, 32, and 33, in FIG. 2 after being subjected to a first OPC having pump frequency 35 the phase of each channel is conjugated and the channels are reflected around the pump frequency so that their new frequency is respectively 31', 32', and 33'. As is shown in FIG. 2, therefore, the channels are shifted in frequency and their order is reversed. The signal from the first OPC is then input to a second OPC the second OPC having for example pump frequency 36 in FIG. 3. In accordance with the action of an OPC the phase of each channel is conjugated and its frequency is reflected about the pump frequency. Therefore channel 33' is shifted to the frequency shown at 33", 32' is shifted to the frequency at 32", and 31' is shifted to the frequency at 31". Additionally since the initial multichannel signal has undergone phase conjugation twice, the phase of each channel is the same as the initial phase before traversing the first OPC. The overall effect of the frequency shifter e.g. the two OPCs, is that there is no phase conjugation of each channel but there is a shift in the frequency of each channel from 31, 32, and 33 to respectively 31", 32", and 33" without changing the order of the channels.

The multiplexed channels 31", 32", and 33" are then demultiplexed. It is possible for the amount of frequency shift, however, to vary with the channel. All or some of these channels are then subjected to an individual OPC tailored for such channel. That is, the OPC for each such demultiplexed channel has a different pump wavelength so that the channel (s) undergoing this phase conjugation is shifted, for example, essentially back to its original frequency. (Again for ease of description the discussion will be in terms of all three demultiplexed channels being shifted although this is not required in every embodiment of the invention i.e. compensating shifts for only a portion of all the channels is possible.)

Figure 4:
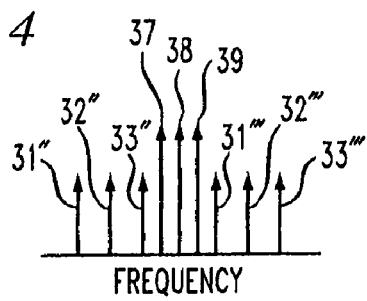

Thus as shown in FIG. 4 channel 31" is subjected to an OPC having pump frequency 37. The resulting channel, 31''' has its phase conjugated and has a frequency essentially the same as channel 31 before undergoing the frequency shifter. Similarly channel 32" is subjected to an OPC having pump frequency 38 is phase conjugated and shifted to frequency 32''' essentially equal to original frequency 32. In a corresponding manner channel 33" traverses an OPC with pump frequency 39 and is shifted to frequency 33''' with conjugated phase and with frequency essentially equal to frequency 33. (Essentially the same frequency in the context of this invention means a frequency to within 125 GHz cm$^{-1}$.)

The overall effect of the conjugator DM sequence is to conjugate the phase of the channels subjected to their individual OPCs and to individually shift the frequency of each treated channels without dependence on another channel. (Although in a preferred embodiment the channels are shifted back to their original frequencies, it is possible, and within the inventive context of all embodiments to shift the channels to a frequency that is other than the original channel frequencies while maintaining the original order of the channels and conjugating their phase.) The beneficial results of the combination of conjugator DM sequence with the complementary device, a frequency shifter, is to conjugate the phase of chosen channels while maintaining the order of desired channels and while adjusting channel frequency without being limited to the effect dictated such as shown in FIG. 2 by use of a single OPC for all channels.

Figure 5:
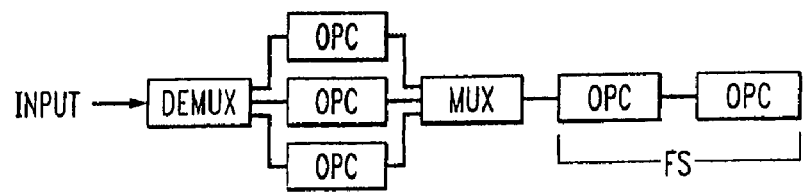
Figure 5:
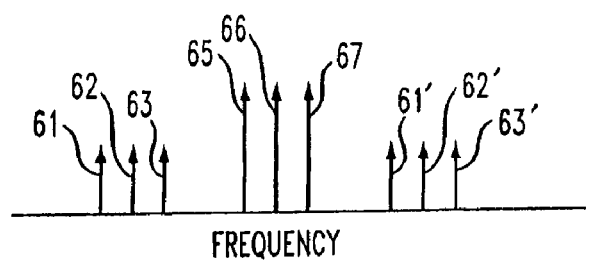
Figure 6:
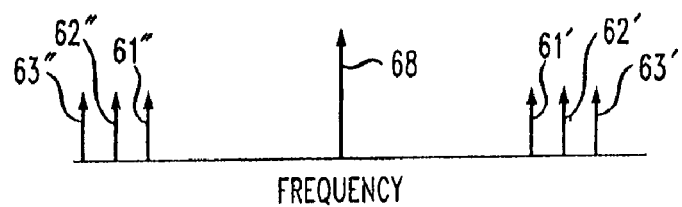
Figure 7:
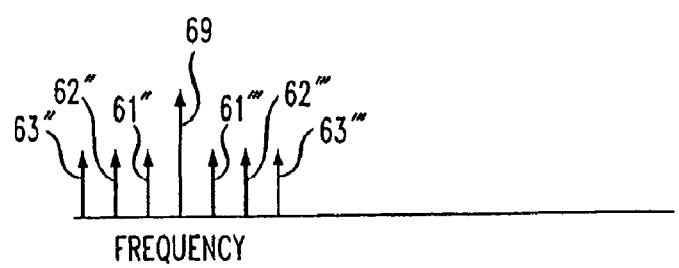

In a second embodiment, a conjugator DM sequence is performed before the complementary frequency shifter. Thus as shown in FIG. 5 channel 61, 62, and 63 after demultiplexing are propagated through OPCs having pump frequency respectively 65, 66, and 67 yielding channels having their phase conjugated and at corresponding frequencies 61', 62', and 63'. Accordingly the phases are conjugated, the frequencies are shifted, but the order of the channels is the same. The channels are then multiplexed. After this conjugator DM sequence a complementary frequency shifting operation or sequence is performed, for example, as shown in FIG. 6, multiplexed channels 63', 62', and 61' are propagated through an OPC having pump frequency 68. The phase of each channel is conjugated, the frequency is shifted, and the order of the channels is reversed to yield channels 63", 62", and 61". To complete the frequency shifter sequence, channel 63", 62", and 61" traverse an OPC with pump frequency 69 to yield channel 63''', 62''', and 61'''. As a result of the DM sequence and complementary frequency shifter, the phase of each channel is conjugated from that of its original phase, the frequencies are shifted back, for example, to those of the original channels and the order of the channels are the same as original.

Figure 8:
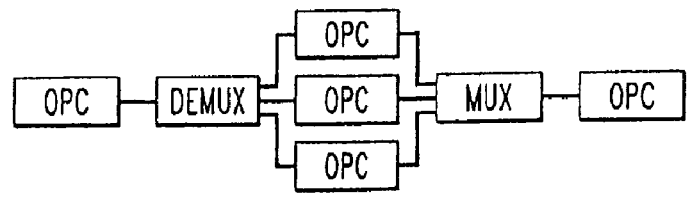
Figure 8:
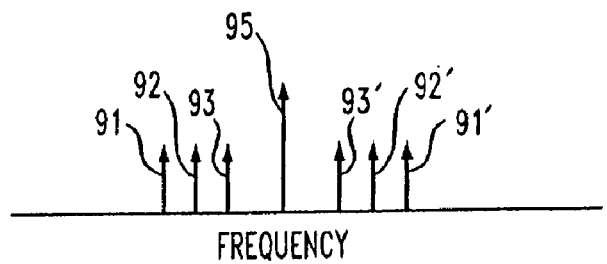
Figure 9:
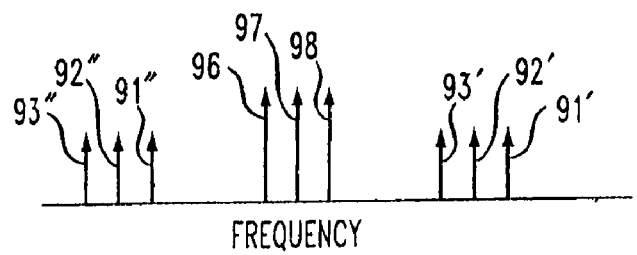
Figure 10:
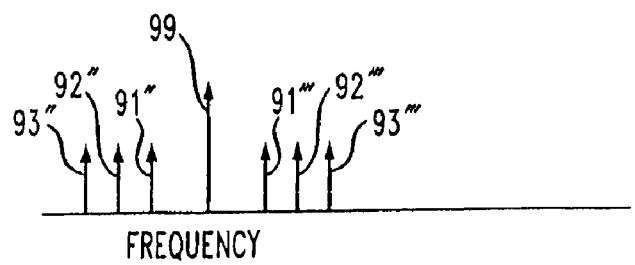

In a third embodiment a portion of a frequency shifting sequence is first performed, then the conjugator DM sequence is performed, and finally the remainder of the frequency shift sequence is performed. As shown in FIG. 8 the multichannel signal 91, 92, 93 is subjected to an OPC having pump frequency 95. The result is a conjugation of phase for all channels, a reversal of channel order, and a shift in frequency. Having completed a portion of the frequency shift sequence, the conjugator DM sequence is performed. That is, the channels 93', 92', and 91' are demultiplexed. The demultiplexed channels are propagated respectively through OPCs having pump frequencies 96, 97, and 98 to produce demultiplexed channels 93", 92", and 91". As shown in FIG. 9, the pump frequencies 96 through 98 are selected so that the order of the channels remains reversed, the frequencies are again shifted, and the phase of each channel is back to its original state. To complete the conjugator DM sequence, the channels 93", 92", and 91" are multiplexed. The multiplexed signal is propagated through an OPC having pump frequency 99 in FIG. 10 to complete the frequency shifter sequence. The order of the channels is reversed, the phase of all channels conjugated, and the frequencies shifted. The result is each of the original channels has had its phase conjugated, the order of the channels is undisturbed, and the frequency of each channel 91''', 92''', and 93''' is essentially the same as its corresponding original channel 91, 92, and 93. Thus, the use of a frequency shifting sequence whose steps are separated by a conjugator DM sequence also produces a desirable result.

Figure 11:
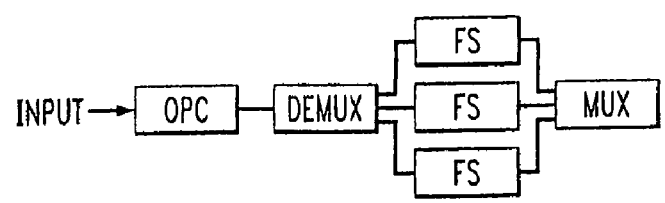
Figure 11:
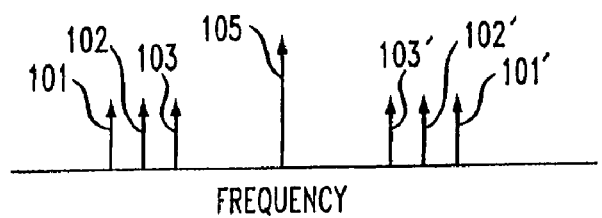

In a fourth embodiment, channels 101, 102, and 103 in FIG. 11 are treated by an OPC (the complementary device) with pump frequency 105 to shift the channels to 101', 102', and 103', respectively. The order of the channels is reversed and each channel is conjugated. The channels 101', 102', and 103' are demultiplexed and each channel is frequency shifted back respective to 101, 102, and 103. After such shifting the channels are multiplexed completing the frequency shifter DM. The channels in sum are each conjugated but are in the same frequency order and at the original frequencies.

Figure 12:
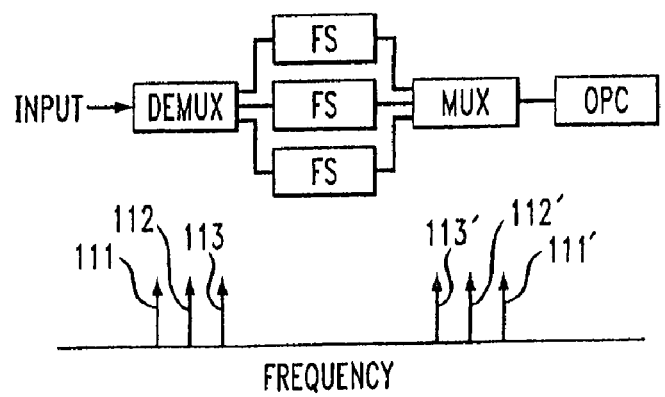
Figure 13:
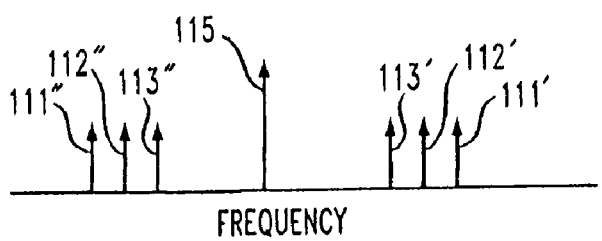

In a fifth embodiment, channels 111, 112, and 113 in FIG. 12 are demultiplexed and individually shifted to 111', 112', and 113', respectively. The channels are, thus, reversed in frequency order, frequency shifted, but are not phase conjugated. To complete the frequency shifter DM these channels are then multiplexed. The multiplexed signal is propagated through an OPC (a complementary device to the frequency shifter DM) with pump frequency 115 in FIG. 13. The channels are thus each conjugated and the resulting channels 111", 112", and 113" are returned to the original frequency of 111, 112, and 113.

As previously discussed, the five embodiments are described in detail for pedagogic purposes. Not all channels need be subjected to the DM sequence; the frequency shifter need not necessarily be two OPCs and; the number of channels need not be three. Additionally the specific frequency of the pump is not critical provided the frequency of the pumps used in the frequency shifter sequence relative to the frequency used in the DM sequence is such that the combined frequency shift is the one desired. It is also preferable that the pump frequency of an OPC is not within 250 gigabits of a channel that it is processing. The invention described is useful in conjunction with the approach to reducing the penalty associated with nonlinear effects described in concurrently filed U.S. patent application Ser. No. 10/442,287 dated May 20, 2003 (Chowdhury 5-8, filed by Aref Chowdhury, et.al.) which is hereby incorporated by reference in its entirety.

We claim:

1. A multichannel optical communications system including an apparatus that acts on an incoming multichannel signal to produce a phase conjugation of at least one of said channels of said incoming multichannel signal, said apparatus comprising:
    a demultiplexer/multiplexer sequence for said multichannel signal, said demultiplexer/multiplexer sequence including an optical phase conjugator or a frequency shifter; and
    a device complementary to said demultiplexer/multiplexer sequence; and
    wherein said demultiplexer/multiplexer sequence and said complementary device are configured to operate on said multichannel signal and wherein at least a portion of said complementary device operates on said multichannel signal before or after said demultiplexer/multiplexer sequence operates on said multichannel signal,
    wherein said complementary device is an optical phase conjugator if said demultiplexer/multiplexer sequence includes the frequency shifter and is said frequency shifter if said demultiplexer/ multiplexer sequence includes said optical phase conjugator; and
    wherein an output frequency order of said channels is an input frequency order of said channels and an output multichannel signal includes said phase conjugation of said at least one of said channels of said incoming multichannel signal.

2. The system of claim 1 wherein the complementary device comprises a frequency shifter wherein said frequency shifter comprises components, and where said components comprising said frequency shifter are separated by said demultiplexer/multiplexer sequence that comprises a conjugator demultiplexer/muttiplexer sequence.

3. The system of claim 1 wherein said communication system is configured such that said complementary device comprises a frequency shifter that acts on said multichannel signal before said demultiplexer/multiplexer sequence that comprises a conjugator demultiplexer/multiplexer sequence.

4. The system of claim 1 wherein said communication system is configured such that said complementary device comprises a frequency shifter that acts on said multichannel signal after said demultiplexer/multiplexer sequence that comprises a conjugator demultiplexer/multiplexer sequence.

5. The system of claim 1 wherein said demultiplexer/multiplexer sequence includes an optical phase conjugator for each channel of said multichannel signal.

6. The system of claim 5 wherein an optical phase conjugator for each channel of said multichannel signal has an associated differing pump frequency.

7. The system of claim 1 wherein said complementary device comprises an OPC that acts on said signal before said demultiplexer/multiplexer sequence that comprises a frequency shifter demultiplexer/multiplexer sequence.

8. A system of claim 1 wherein said complementary device comprises an OPC that acts on said signal after said demultiplexer/multiplexer sequence that comprises a frequency shifter demultiplexer/multiplexer sequence.

9. A procedure for processing an incoming multichannel optical signal comprising multiple channels, said procedure comprising the steps of:
    performing a first operation comprising: shifting the frequency of a multiplexed optical signal comprising a plurality of said channels or phase conjugating said multiplexed optical signal,
    demultiplexing said multiplexed optical signal, and
    performing an operation complementary to said first operation on at least one channel of said demultiplexed signal and multiplexing at least a portion of said demultiplexed signal wherein said portion includes said channel that has undergone said complementary operation after demultiplexing wherein said operation complementary to said first operation is an optical phase conjugation if said first operation is a shifting in frequency and is a frequency shifting if said first operation is an optical phase conjugation; and
    wherein an output frequency order of said channels is an input frequency order of said channels and an output multichannel signal includes phase conjugation of at least one of said multiple channels of said incoming multichannel optical signal.

10. The procedure of claim 9 wherein said shifting is achieved by employing two primary optical phase conjugators.

11. The procedure of claim 10 wherein one of said primary optical phase conjugators acts on said multichannel signal before said demultiplexing and one of said primary optical phase conjugators acts on said signal after said multiplexing.

12. The procedure of claim 10 wherein both said primary phase conjugators act on said multichannel signal before said demultiplexing.

13. The procedure of claim 10 wherein both said primary phase conjugators act on said multichannel signal after said multiplexing.

14. The procedure of claim 9 wherein each of said channels of said multichannel signal undergoes a phase conjugation occurring after demultiplexing but before multiplexing.

15. The procedure of claim 9 wherein said first operation comprises phase conjugation.

16. The procedure of claim 15 wherein said first operation is performed before said demultiplexing.

17. The procedure of claim 15 wherein said first operation is performed after said multiplexing.

18. The method of claim 9, wherein an optical phase conjugation of each channel of said multichannel signal has an associated differing pump frequency.

* * * * *